BEST AVAILABLE COPY

M. J. PERRY, JR

PITCHER

Nov. 11, 1930.

Re. 17,863

Original Filed Aug. 4, 1928

Inventor
Marsden J. Perry, Jr.
By Thomas A. Jenckes Jr.
Attorney

BEST AVAILABLE COPY

Reissued Nov. 11, 1930

Re. 17,863

UNITED STATES PATENT OFFICE

MARSDEN J. PERRY, JR., OF PROVIDENCE, RHODE ISLAND

DESIGN FOR A PITCHER

Original No. 77,027, dated November 27, 1928, Serial No. 27,705, filed August 4, 1928, for 14 years. Application for reissue filed June 12, 1929. Serial No. 31,655. Term of patent 14 years.

*To all whom it may concern:*

Be it known that MARSDEN J. PERRY, Jr., a citizen of the United States, residing at Providence, in the county of Providence and State of Rhode Island, has invented a certain new, original, and ornamental Design for a Pitcher, of which the following is a specification, reference being had to the accompanying drawings, forming a part thereof.

In the drawings, Fig. 1 is a side elevation of a pitcher embodying my new design.

Figure 1:
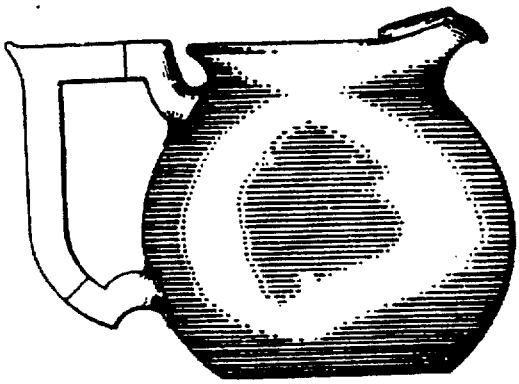
Figure 2:
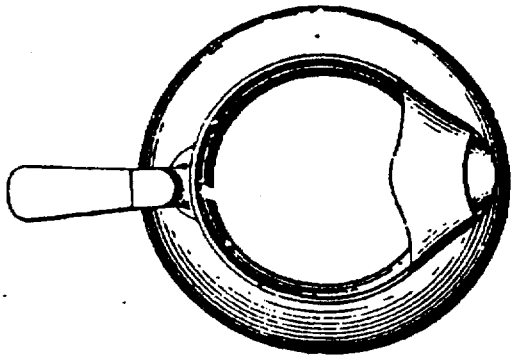
Fig. 2 is a plan view thereof.
Figure 3:
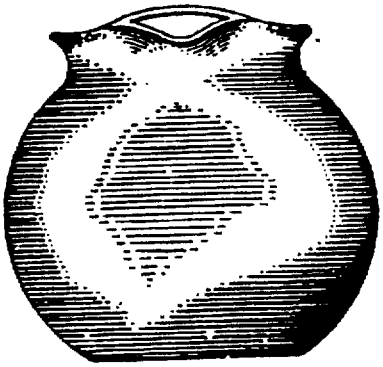
Fig. 3 is a front elevation thereof.

I claim:

The ornamental design for a pitcher substantially as shown.

In testimony whereof I affix my signature.

MARSDEN J. PERRY, Jr.